A. SHERWOOD.
Fruit Jar.
No. 50,172.
Patented Sept. 26, 1865.
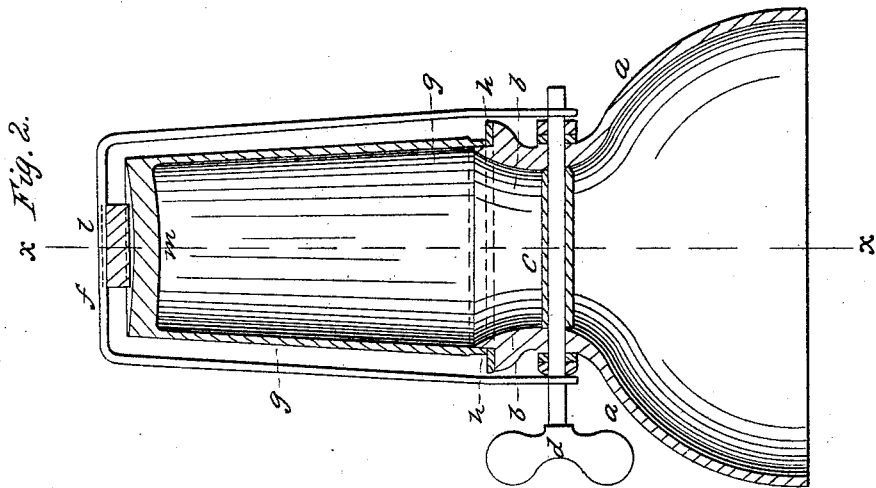
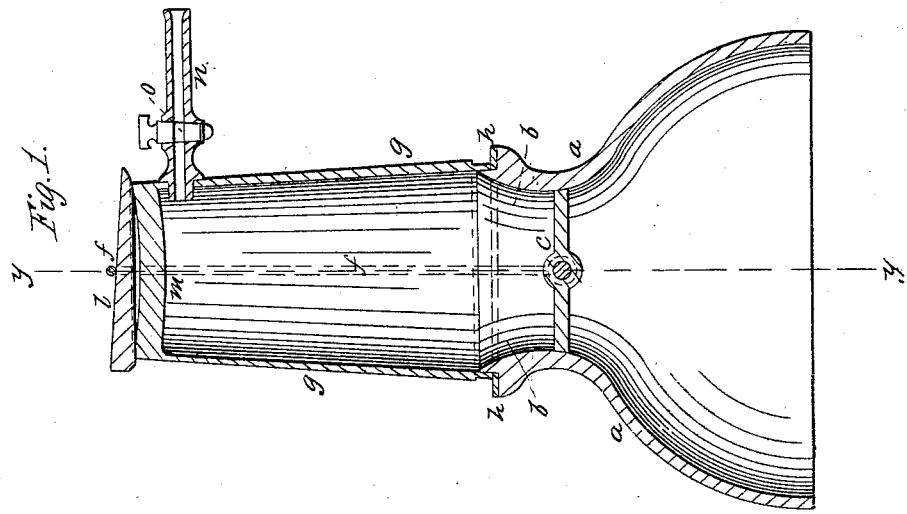
Witnesses:
Inventor:

UNITED STATES PATENT OFFICE.

ALLEN SHERWOOD, OF AUBURN, NEW YORK.

IMPROVEMENT IN FRUIT-JARS.

Specification forming part of Letters Patent No. 50,172, dated September 26, 1865.

*To all whom it may concern:*

Be it known that I, ALLEN SHERWOOD, of Auburn, in the county of Cayuga and State of New York, have invented new and useful Improvements in Fruit-Jars; and I do hereby declare that the following is a full, clear, and exact description thereof, which will enable others skilled in the art to make and use the same, reference being had to the accompanying drawings, forming part of this specification.

With the present mode of preserving fruit in jars, cans, bottles, and other similar or suitable articles generally employed therefor, when desired to use a portion of the fruit in any one jar it is impossible to remove it therefrom without exposing the balance of it to the air, which soon so affects it as to render it wholly unfit to be eaten, and, therefore, it has been necessary to put the fruit up in small jars, cans, or bottles, each containing about the quantity of fruit which would be sufficient for use at any one time; but this, it is obvious to all, is not only very expensive, but also inconvenient, for the reason that a great number of cans or jars were necessary if any quantity of fruit was to be preserved.

To obviate this difficulty is, therefore, the principal object of the present invention, and is satisfactorily accomplished thereby, it consisting in using upon the mouth of the jar, can, or other article in which the preserved fruit is placed a secondary vessel or receiver, the joint of which therewith is made perfectly air-tight in any proper manner, into which receiver, when so attached, a sufficient quantity of the fruit in the jar is placed by opening the cover or closing mouth-piece of the same—the air first, however, having been exhausted from the receiver in and by any suitable mode, thus producing a perfect vacuum, or as near as possible, therein, whereby the receiver can be readily charged with the fruit without the air coming in contact therewith in the least degree—after which the cover of the jar is closed upon it, and the receiver, with the fruit, then detached from the vessel or preserve-jar, and so on as often as may be desired, the fruit remaining in the jar being always kept as pure and sweet as if none had been removed.

Having thus generally stated the objects and principles of the present invention, I will now proceed to describe the same in detail, reference being had to the accompanying plate of drawings, in which—

Figures 1 and 2 are central vertical sections of the top portion of a jar having my receiver applied thereto, taken respectively in the planes of the lines $x\ x$ and $y\ y$ of each other.

$a\ a$ in the drawings represent the top portion of a jar, which may be made of glass, clay, crockery-ware, or any other suitable material; $b$, its mouth or orifice provided with a valve, $c$, having handle $d$ upon the outside of the jar. This valve, when in the position represented in Fig. 1 or horizontal, closes the mouth of the jar, and vice versa in Fig. 2, it being intended or have the valve so arranged and constructed that when closed it shall form a perfect air-tight joint with the jar, so that no air, when the fruit is placed in it, can possibly reach the same.

$f$ is the bail hung upon the jar for convenience in handling and moving the same from place to place, which bail also serves another purpose, as will be presently explained.

$g$ is the secondary vessel or receiver, made of glass or any other suitable material; but glass I deem the best to use, as then the quantity of fruit put in it can be readily discerned and thus regulated at pleasure, which vessel is placed by its mouth over and around the mouth of the jar, a rubber ring, $h$, being attached to the latter, so as to make a more perfect air-tight joint when the vessel is secured thereon, which in this case is illustrated by means of the bail $f$ swung up in proper position therefor, with a wedge-piece, $l$, forced and wedged in and between it and the bottom plate, $m$, of the vessel. At or near the bottom of the vessel is a short pipe, $n$, provided with a stop-cock, $o$, through which pipe the air contained in the receiver is exhausted in any proper manner, so as to produce a perfect, or as nearly so as possible, vacuum in the receiver. The receiver having been thus secured upon the mouth of the jar and the air exhausted therefrom, as described, the fruit contained in the jar or such portion of the same as it may be desired to use may then be placed in the receiver by simply opening the closing-valve of the jar by its handle and tipping or inclining the jar sufficiently to cause it to pass therefrom to the receiver, which having been filled to the requisite degree, the valve is then tightly closed again and the vessel detached from the jar, when the fruit in it can be placed in any proper dish for use.

From the above description it is apparent that any desired amount or quantity of the fruit in a jar, can, bottle, or other article usually employed for preserving it can be removed at pleasure without admitting any air to the remaining portion in the jar, the advantages of which are so self-evident to all as to render any particular mention herein almost superfluous.

In addition to the valve an additional cover may be used, if desired, but I do not deem it necessary.

I claim as new and desire to secure by Letters Patent—

Removing preserved fruit from a can, jar, bottle, or other article in which it may have been placed by means of a secondary receiver or vessel properly secured thereon, and from which the air is exhausted, substantially in the manner described, and for the purpose specified.

The above specification of my invention signed by me this 28th day of June, 1865.

ALLEN SHERWOOD.

Witnesses:
   ALBERT W. BROWN,
   M. M. LIVINGSTON.